US007374633B2

(12) United States Patent
Sellars

(10) Patent No.: US 7,374,633 B2
(45) Date of Patent: May 20, 2008

(54) EXTENDED WRAP LABEL

(75) Inventor: Neil G. Sellars, Cinnaminson, NJ (US)

(73) Assignee: National Label Company, Lafayette Hill, PA (US)

( * ) Notice: Subject to any disclaimer, the term of this patent is extended or adjusted under 35 U.S.C. 154(b) by 0 days.

(21) Appl. No.: 10/634,443

(22) Filed: Aug. 5, 2003

(65) Prior Publication Data

US 2004/0028866 A1 Feb. 12, 2004

Related U.S. Application Data

(62) Division of application No. 09/404,429, filed on Sep. 23, 1999, now Pat. No. 6,613,410.

(51) Int. Cl.

*B29C 65/48* (2006.01)
*B32B 37/30* (2006.01)
*B32B 38/14* (2006.01)

(52) U.S. Cl. ....................................... 156/277; 156/289

(58) Field of Classification Search ................ 156/277, 156/250, 267, 247, 248, 278, 289; 428/40.1, 428/42.1, 42.2, 42.3, 43, 192, 355, 914, 542.6, 428/916; 283/72, 81, 101, 105, 103; 40/308, 40/310, 324, 630, 510

See application file for complete search history.

(56) References Cited

U.S. PATENT DOCUMENTS 1,054,826 A 3/1913 Cole
1,145,367 A 7/1915 Herter
1,756,944 A 5/1930 Gorton, Jr.
3,223,557 A 12/1965 Reilly et al.
3,524,782 A 8/1970 Buske
3,673,953 A 7/1972 Massari
3,733,002 A 5/1973 Masaaki
3,750,317 A 8/1973 Morgan
3,753,781 A 8/1973 Parker et al.

(Continued)

FOREIGN PATENT DOCUMENTS

EP 0 463 193 1/1992

(Continued)

OTHER PUBLICATIONS

"National Label Company 700° Series Expanded Content Labels," 4 items—Nov. 1996.

(Continued)

*Primary Examiner*—Philip Tucker
*Assistant Examiner*—Sing P. Chan
(74) *Attorney, Agent, or Firm*—Reed Smith LLP

(57) ABSTRACT

A method for making a unitary label suitable for attachment to an object with a circumference, including forming the label with first and second contiguous label portions. The first and second label portions each have top and bottom surfaces. The first and second label portions have a combined length which is greater than the circumference of the object. The method further includes printing ink on at least one of the top surface of the first label portion and the top surface of the second label portion and the bottom surface of the second label portion, while also applying pressure sensitive adhesive to the bottom surface of the first label portion.

13 Claims, 8 Drawing Sheets

U.S. PATENT DOCUMENTS

| | | | | |
|---|---|---|---|---|
| 4,172,163 | A | | 10/1979 | Magnotta |
| 4,235,341 | A | | 11/1980 | Martin et al. |
| 4,287,274 | A | | 9/1981 | Ibbotson et al. |
| 4,307,900 | A | | 12/1981 | Krautsack |
| 4,312,523 | A | | 1/1982 | Haines |
| 4,323,608 | A | | 4/1982 | Denny et al. |
| 4,324,058 | A | | 4/1982 | Sherwick et al. |
| 4,349,592 | A | | 9/1982 | Nussbaum |
| 4,472,895 | A | * | 9/1984 | Cillario ....................... 40/312 |
| 4,504,348 | A | | 3/1985 | Instance |
| 4,525,416 | A | | 6/1985 | Hammerschmidt et al. |
| 4,534,582 | A | | 8/1985 | Howard |
| 4,560,432 | A | | 12/1985 | Instance |
| 4,592,572 | A | | 6/1986 | Instance |
| 4,608,323 | A | | 8/1986 | Zaborney |
| 4,627,154 | A | | 12/1986 | Pattison |
| 4,637,633 | A | | 1/1987 | Instance |
| 4,655,209 | A | | 4/1987 | Scott |
| 4,675,062 | A | | 6/1987 | Instance |
| 4,680,080 | A | | 7/1987 | Instance |
| 4,711,686 | A | | 12/1987 | Instance |
| 4,726,972 | A | | 2/1988 | Instance |
| 4,727,667 | A | | 3/1988 | Ingle |
| 4,744,591 | A | | 5/1988 | Instance |
| 4,746,556 | A | | 5/1988 | Matsuguchi et al. |
| 4,747,618 | A | | 5/1988 | Instance |
| 4,758,456 | A | | 7/1988 | Muscala |
| 4,763,931 | A | | 8/1988 | Matsuguchi et al. |
| 4,801,514 | A | | 1/1989 | Will |
| 4,847,130 | A | | 7/1989 | Cooper |
| 4,849,043 | A | | 7/1989 | Instance |
| 4,850,613 | A | | 7/1989 | Instance |
| 4,876,123 | A | | 10/1989 | Rivera et al. |
| 4,888,078 | A | | 12/1989 | Instance |
| 4,894,106 | A | | 1/1990 | Instance |
| 4,911,994 | A | | 3/1990 | Will et al. |
| 4,930,812 | A | | 6/1990 | Howard |
| 4,933,043 | A | | 6/1990 | Instance |
| 4,964,513 | A | | 10/1990 | Ingram et al. |
| 5,019,436 | A | | 5/1991 | Schramer et al. |
| 5,026,616 | A | | 6/1991 | Schumm, Jr. |
| 5,031,938 | A | | 7/1991 | Instance |
| 5,079,108 | A | | 1/1992 | Annen et al. |
| 5,153,042 | A | | 10/1992 | Indrelie |
| 5,174,605 | A | | 12/1992 | Instance |
| 5,222,766 | A | | 6/1993 | Instance |
| RE34,366 | E | | 9/1993 | Instance |
| 5,250,337 | A | | 10/1993 | Treichel et al. |
| 5,262,214 | A | | 11/1993 | Instance |
| 5,262,251 | A | | 11/1993 | Will et al. |
| 5,264,265 | A | | 11/1993 | Kaufmann |
| 5,284,363 | A | | 2/1994 | Gartner |
| 5,294,470 | A | | 3/1994 | Ewan |
| 5,312,712 | A | | 5/1994 | Will et al. |
| 5,326,654 | A | | 7/1994 | Will et al. |
| 5,342,093 | A | | 8/1994 | Weernink |
| 5,346,259 | A | | 9/1994 | Mocilnikar et al. |
| 5,358,804 | A | | 10/1994 | Will et al. |
| 5,376,418 | A | | 12/1994 | Rogers et al. |
| 5,399,403 | A | | 3/1995 | Instance |
| 5,403,636 | A | | 4/1995 | Crum |
| 5,445,856 | A | | 8/1995 | Chaloner-Gill |
| 5,518,787 | A | | 5/1996 | Konkol |
| 5,584,955 | A | | 12/1996 | Instance |
| 5,587,222 | A | | 12/1996 | Hoffmann |
| 5,591,290 | A | * | 1/1997 | Walter et al. ............... 156/152 |
| 5,591,541 | A | | 1/1997 | Oltman et al. |
| 5,605,230 | A | | 2/1997 | Marino et al. |
| 5,618,600 | A | | 4/1997 | Denklau |
| 5,700,537 | A | | 12/1997 | Instance |
| 5,720,499 | A | * | 2/1998 | Sakashita ..................... 283/81 |
| 5,727,819 | A | | 3/1998 | Grosskopf et al. |
| 5,817,382 | A | | 10/1998 | Cheng |
| 5,869,160 | A | | 2/1999 | Mason et al. |
| 5,975,575 | A | | 11/1999 | Instance |
| 5,989,667 | A | | 11/1999 | Tayebi |
| 5,996,849 | A | | 12/1999 | Bansal |
| 6,073,377 | A | * | 6/2000 | Mehta ......................... 40/638 |
| 6,091,406 | A | | 7/2000 | Kambara et al. |
| 6,118,435 | A | | 9/2000 | Fujita et al. |
| 6,274,236 | B1 | | 8/2001 | Shacklett et al. |
| 6,304,251 | B1 | | 10/2001 | Ito et al. |
| 6,327,801 | B1 | | 12/2001 | Witkowski |
| 6,331,018 | B1 | | 12/2001 | Roth et al. |
| 6,332,631 | B1 | | 12/2001 | Kirk |
| 6,364,990 | B1 | | 4/2002 | Grosskopf et al. |
| 6,385,878 | B1 | * | 5/2002 | Key ........................... 40/306 |
| 6,428,867 | B1 | | 8/2002 | Scott et al. |
| 6,608,618 | B2 | | 8/2003 | Wood et al. |
| 6,613,410 | B1 | | 9/2003 | Sellars |
| 6,637,775 | B1 | | 10/2003 | Bernier et al. |
| 6,770,345 | B2 | | 8/2004 | Sellers |
| 2001/0015597 | A1 | | 8/2001 | Matsui et al. |
| 2002/0146546 | A1 | | 10/2002 | Cooley |
| 2003/0027700 | A1 | | 2/2003 | Sellars |
| 2003/0061750 | A1 | | 4/2003 | Bernier et al. |
| 2004/0028866 | A1 | | 2/2004 | Sellars |
| 2006/0066096 | A1 | | 3/2006 | Kan |

FOREIGN PATENT DOCUMENTS

| | | | | |
|---|---|---|---|---|
| GB | 2 238 772 | | | 6/1991 |
| GB | 2 277 075 | | | 10/1994 |
| GB | 2299568 | A | * | 10/1996 |
| GB | 2311273 | A | * | 9/1997 |
| JP | 410245021 | A | | 12/1993 |
| JP | 405346764 | | | 9/1998 |
| WO | WO 97/46378 | | | 5/1997 |
| WO | WO 97/21202 | | | 6/1997 |
| WO | WO 98/14928 | | | 4/1998 |
| WO | WO 00/65558 | | | 11/2000 |

OTHER PUBLICATIONS

International Search Report, dated Jan. 12, 2001 in the counterpart International Patent Application.

English abstract for EPO No. 0 463 193 A1.

* cited by examiner

EXTENDED WRAP LABEL

REFERENCE TO RELATED APPLICATION

This application is a divisional application of application Ser. No. 09/404,429, filed Sep. 23, 1999, now U.S. Pat. No. 6,613,410 entitled 'Extended Wrap Label', the entire disclosure of which is hereby included by reference herein.

FIELD OF THE INVENTION

The present invention relates in general to labels and, more particularly, to labels for products and product containers.

BACKGROUND OF THE INVENTION

Labels, typically in the form of flexible sheet or web material attached to an object, have long been used to identify the object, its contents and/or display other information associated with the object. Such labels, which are normally fabricated from paper or plastic, are usually adhesively secured to the object by a contact or pressure sensitive adhesive material.

Many objects such as jars, bottles, cans and similar receptacles support "wrap" labels which cover substantially all of their circumferential side wall surfaces. With these labels, essentially the entire outer surface of the label is available as an indicia bearing surface. A label covering all or nearly all of the circumferential area of an object such as a product container is oftentimes sufficient to convey desired advertising, content information, instructions, warnings, and the like. In many circumstances, however, an object's physical dimensions detrimentally limit the available print space of the label borne thereby.

A common solution to the problem of limited label print area, as taught for example in U.S. Pat. Nos. 5,458,374, 5,439,721 and 5,403,636, is to affix an additional multi-sheet leaflet or "outsert" to the exterior of the label. While generally effective for providing additional print space, such leaflets complicate the label assembly process in that at least three fabrication steps must be performed, apart from printing and placement of any necessary adhesive and release layers, in order to manufacture the label. That is, the base label must be cut to desired dimensions, the leaflet must be similarly cut and/or folded, and the leaflet must be secured to the base label. Moreover, the multiple layers of the leaflet may add considerable thickness and bulk to the label construction. Such label designs may also be unwieldy to the end user of the product if the leaflet is folded in a complicated pattern and is difficult to refold into its compact folded initial configuration. Further, because the base label and leaflet are discrete parts which must be joined to one another during the assembly process, the possibility exists that the leaflet may become detached from the base label and thereafter become misplaced. In that event, the additional printed information borne by the leaflet and, thus, the utility of the leaflet itself are lost.

An advantage exists, therefore, for a unitary, i.e., one-piece, label construction which offers enhanced printable surface area capacity versus wrap labels of conventional design.

Other details, objects and advantages of the present invention will become apparent as the following description of the presently preferred embodiments and presently preferred methods of practicing the invention proceeds.

SUMMARY OF THE INVENTION

A method for making a unitary label suitable for attachment to an object having a circumference, the method including the steps of forming the label having first and second contiguous label portions, wherein the first and second label portions each have top and bottom surfaces, and wherein the first and second label portions have a combined length which is greater than the circumference of the object; printing ink on at least one of the top surface of the first label portion and the top surface of the second label portion and the bottom surface of the second label portion; and applying pressure sensitive adhesive to the bottom surface of the first label portion.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
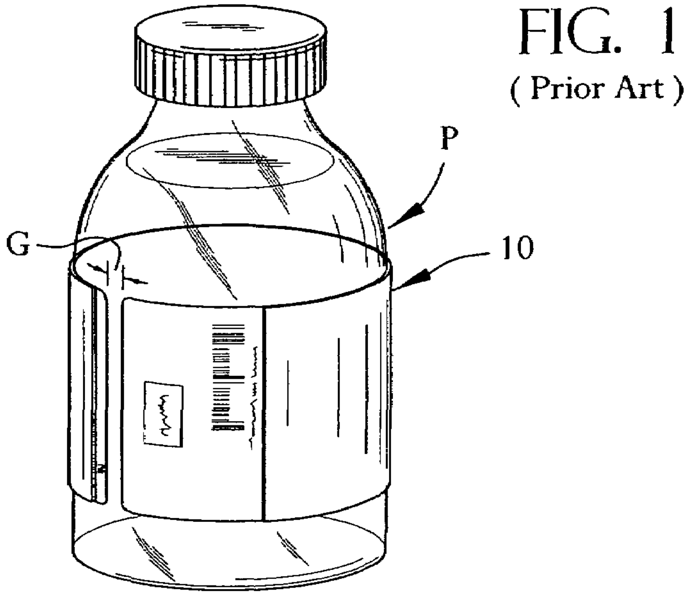
FIG. 1 ( Prior Art )
FIG. 1 is a perspective view of a conventional wrap-type label affixed to a product container.

Referring to FIG. 1, there is shown an object such as a product container P, e.g., a bottle, jar, or the like, Adhesively affixed about the circumferential side wall of container P is a wrap-type label 10. Label 10, as is conventional, may cover any fraction of the circumferential side wall of container P. As illustrated, label 10 is constructed as an elongated strip member spanning nearly the entire circumference of container P such that the ends of the label are separated by a small gap G. The available printing area of such a label is limited by the area, (i.e., length and width) dimensions of the label. Additionally, printing is normally carried only by the exposed exterior surface of the label.

Figure 2:
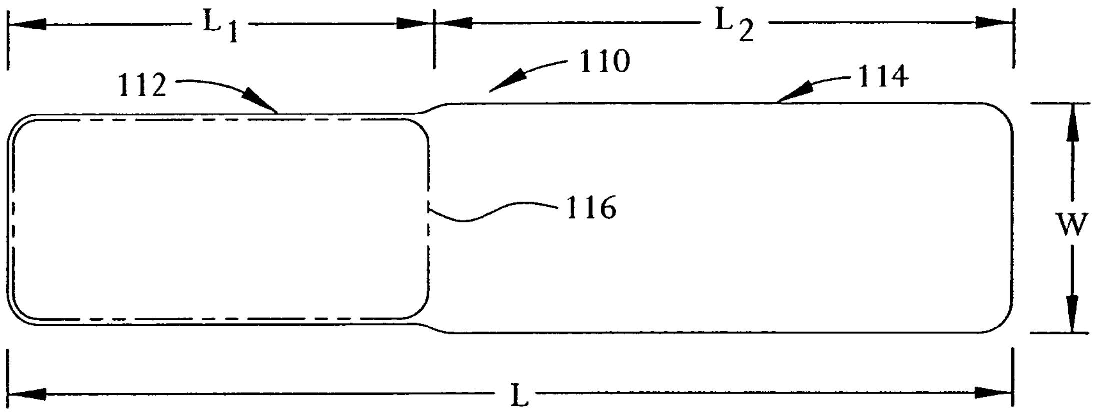
FIG. 2 is a top plan view of a first embodiment of a label constructed in accordance with the present invention.
Figure 3:
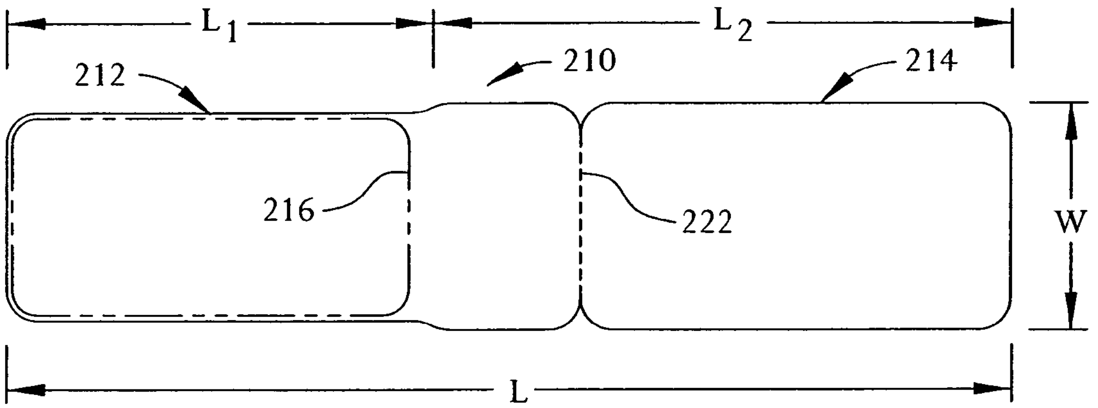
FIG. 3 is a top plan view of a further embodiment of a label constructed in accordance with the present invention.
Figure 4:
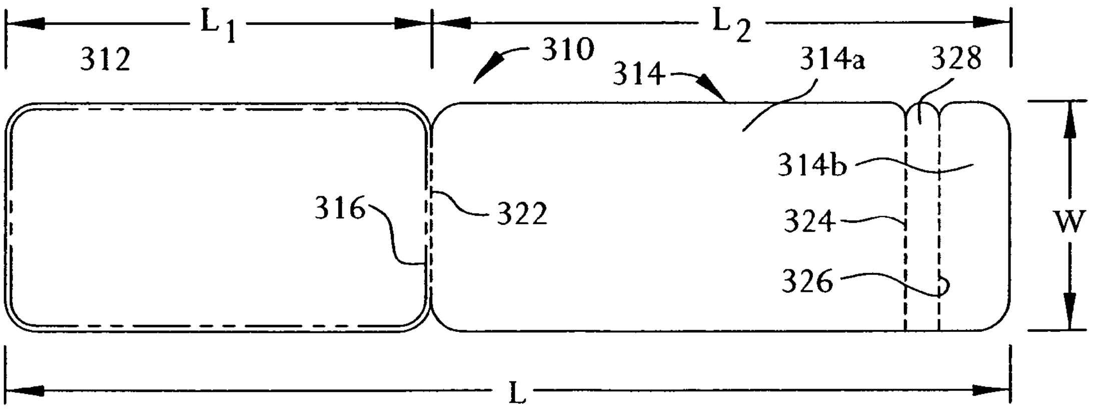
FIG. 4 is a top plan view of a further embodiment of a label constructed in accordance with the present invention.

FIGS. 2, 3 and 4 depict several presently preferred embodiments of labels which alleviate the problem of limited print space associated with conventional wrap labels such as label 10 of FIG. 1, Furthermore, as will be described in greater detail in connection with FIGS. 3 and 4, labels constructed in accordance with the present invention may incorporate structural features which impart additional functions and advantages to the label.

The labels according to the present invention, respectively identified by reference numeral 110 in FIG. 2, 210 in FIG. 3 and 310 in FIG. 4, include several common characteristic features, For instance, each may be comprised of a flexible and printable substrate such as paper or plastic sheet or web material. Although they may be made individually, the labels are preferably produced from rolls of such substrates, such as paper or plastic sheet stock which can be continuously printed, coated with adhesive, applied with protective material, affixed to release paper, and cut to produce multiple labels as further described herein. Additionally, each label has general areal dimensions L and W which represent the length and width dimensions, respectively, of the label Length L is a predetermined distance related to the circumferential dimension of the object to be labeled and width W is that dimension extending perpendicularly to length L. Width W may vary, as may be desired or necessary, along length L.

As used herein, the terms "circumferential," "circumference," or variants thereof shall be construed to include any distance circumscribing the perimeter of the target object to be labeled. The object may comprise a polygonal shape (e.g., square or rectangular), curvilinear shape (e.g., circular or oval) or composite polygonal and curvilinear cross-sectional configuration defining a desired perimetrical exterior wall surface to be covered by label 110, 210, 310, 410, 510, 610, 710 or any other label disclosed herein.

Labels 110, 210 and 310 each include a first portion 112, 212 and 312, respectively, having a length $L_1$. $L_1$ is preferably less than or equal to the circumferential dimension of the object to be labeled. In addition, labels 110, 210 and 310 include second portions 114, 214 and 314, respectively, of length $L_2$ which are contiguous with first portions 112, 212 and 312. Second label portions 114, 214 and 314 provide additional length to first label portions 112, 212 and 312 such that the total length L of the labels 110, 210 and 310 is greater than the circumference of the object to be labeled. All or a portion of the underside of first label portions 112, 212 and 312 may be coated with a layer of pressure sensitive or other adhesive having sufficient tackiness to essentially affix the label on the target object, such adhesive being respectively identified by dot-dash lines 116, 216 and 316.

Each of the second label portions 114, 214 and 314 provides additional print space to labels 110, 210 and 310. Indeed, both the top and bottom surfaces of the second label portions are available as printable surfaces. Further, depending on which of certain other structural features, described below, are incorporated into the label of the present invention, second label portions 114, 214 and 314 may function, without limitation, as resealable and/or removable flaps.

The length $L_2$ of second portions 114, 214 and 314 is dictated by, inter alia, the need for additional print space. The primary practical limitation on the second label portion length $L_2$ and, hence, the overall length L of labels 110, 210 and 310 is that, if $L_2$ results in multiple wraps of the second label portion 114, 214 and 314 about the target object, the several superimposed label layers may produce a label whose bulk and thickness rivals those of presently available two-part (base label and leaflet) label constructions, however, the label of this invention may include any number of wraps of the second label portion about the target object. In fact, the multiple wraps embodiment of this invention may be preferable to known leaflet labels because multiple wraps provide, in most cases, an equal or greater amount of print area than would an equivalent leaflet label while providing a substantially uniform overall diameter to container P. A leaflet label providing an equivalent amount of print area would produce a bulge on the side wall of container P at the point where the leaflet is located thereby creating a non-symmetric overall cross section to container P.

Referring more specifically to FIGS. 2, 3 and 4, FIG. 2 represents the simplest expression of the present invention. According to this embodiment, label 110 comprises first and second portions 112, 114 which are contiguous regions of an elongated unitary strip of material. No perforation exists between first and second label portions 112 and 114, Physical demarcation between first label portion 112 and second label portion may be established by the rightmost edge of the pressure sensitive adhesive 116 underlying first portion 112. The boundary between the first and second label portions 112 and 114 may also be distinguished by a change in width Wand/or the printed image carried on the label.

Figure 5:
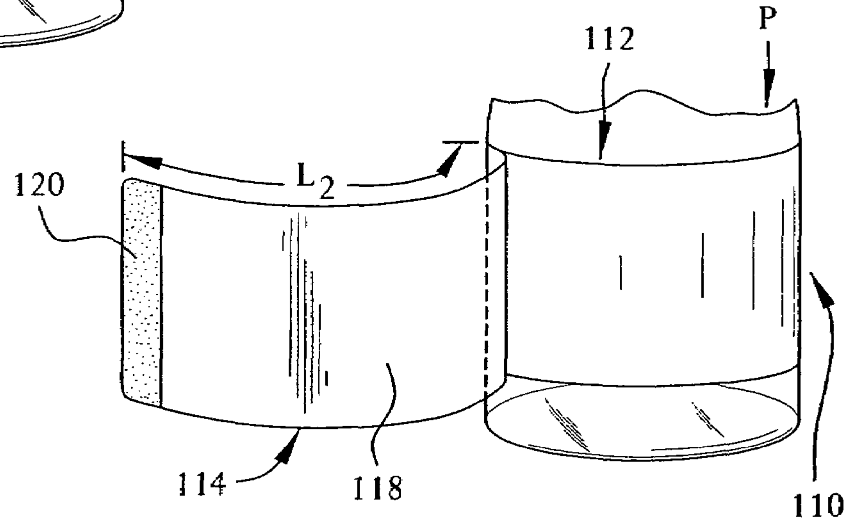
FIG. 5 is a perspective view of a label according to the present invention with a releasable end thereof lifted from the surface of a product container to which the label is affixed.
Figure 6:
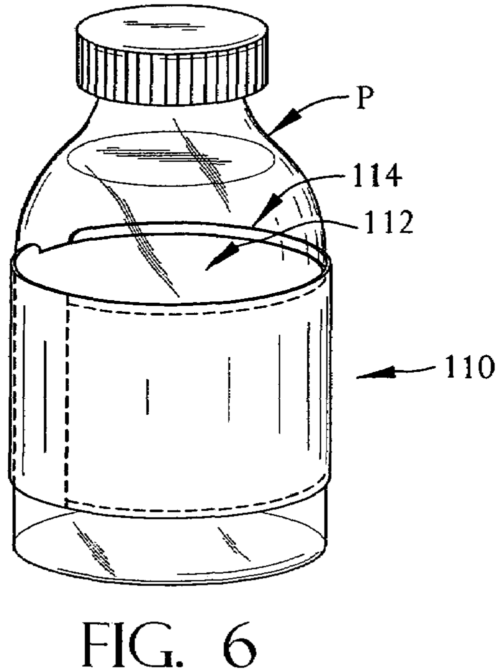
FIG. 6 is a perspective view of the label of FIG. 5 with the releasable end thereof attached to the surface of the product container to which the label is affixed.

FIGS. 5 and 6 are sequential views of the label 110 being applied to an object, e.g., a product container P.

Referring initially to FIG. 5, first label portion 112 of label 110 is shown wrapped about and adhered to the circumference of container P and second label portion 114 is depicted in a lifted and turned-away disposition to expose the bottom surface 118 thereof. Both the top and bottom surfaces of second portion 114 are available as printable surface areas. To enhance the utility of label 110, a comparatively narrow strip of tack adhesive material 120 may be provided along the distal edge of the bottom surface 118 of the second label portion 114. Alternatively, tack adhesive 120 may be applied in any pattern and to any area of bottom surface 118 of second portion 114 and to as much as the entire bottom surface 118. The tackiness of adhesive material 120 should be such that it may enable the second label portion 114 to be selectively and repeatedly adhered to the first label portion 112 substantially in the manner shown in FIG. 6 and released from the first label portion as in FIG. 5 to expose the bottom surface 118 of second label portion 114 at the end user's discretion. Preferably, where the strip of tack adhesive 120 is employed, the label stock is coated with adhesive to enable the strip to releasably adhere to the top surface of the first label portion.

Although second label portion 114 may be of any length, an example best illustrates the degree to which a second label portion 114 of relatively moderate length increases the available print surface area of label 110. Assuming that product container P is a generally cylindrical jar or bottle such as in FIGS. 5 and 6, length $L_1$ of the first portion 112 of label 110 is selected to be substantially equal to that of the circumference of container P. Recalling that both the top and bottom surface of the second label portion 114 may be printed, if the length $L_2$ of the second portion 114 is chosen so as to extend for an additional 360° of arc about the circumference of container P, then the total available print surface area is increased by 200% as compared to the available print surface area of conventional 360° wrap labels. That is, 720° of additional printable surface area is created in a label which consists of no more than two superimposed layers wrapped about container P. As a consequence, a compact, low-bulk and low thickness resultant label construction is produced which offers essentially three times the print area of a presently existing wrap label such as label 10 of FIG. 1.

FIG. 3 represents a further embodiment of the present invention. According to FIG. 3, label 210 is substantially similar in construction to label 110. Hence, only those features which materially distinguish label 210 from label 110 will be described in detail.

Unlike label 110, label 210 includes a perforation 222 which may be placed at or, as illustrated, near the boundary between the first label portion 212 and the second label portion 214. Although not illustrated, second label portion 214 may also include a thin strip of tack adhesive on the bottom surface and at the distal end thereof similar to adhesive material 120 of label 110 (FIG. 5) or in any pattern or to any area of the bottom surface of the second portion. So disposed, the tack adhesive serves to retain the second label portion 214 in contact with the first label portion 212 until deployment of the second label position is desired. In this way, some or all of the second label portion 214 can be torn from the first label portion 212 along perforation 222 to expose the surface of the first label portion previously covered by the second label portion. Additionally, the second label portion according to this embodiment may be adapted for a use, once detached from the first label portion, that is independent of the function of the first label portion. For instance, second label portion 214 may be printed with information such that it may function as a redeemable coupon for consumer merchandise.

FIG. 4 represents another embodiment of the label according to the invention. The label 310 depicted therein, like label 210, includes a perforation 322 generally at or near the boundary between first label portion 312 and second label portion 314. Additionally, second label portion 314 is provided with a pair of comparatively closely spaced perforations 324 and 326 disposed adjacent the end of the second label portion 314 opposite the first label portion 312. Perforations 324, 326 together define a removable tear strip 328, described below, which separates the second label portion 314 into a first non-adhesive-bearing, removable segment 314*a* and a second adhesive-bearing segment 314*b*. Alternatively, a single perforation may be located in second label portion 314 in order to separate second label portion 314 from segment 314*b*.

The bottom surface of the second label segment 314*b* is preferably coated with a pressure sensitive or other adhesive (not illustrated) similar to adhesive 316 provided on the first label portion 312, In this way, when label 310 is fully wrapped about an object such as product container P such as that shown in FIGS. 1, 5 and 6, the first label portion 312 is essentially affixed to the circumferential wall of the container and the second segment 314*b* of the second label portion 314 is similarly affixed to the first label portion 312. Alternatively, if $L_2$ is greater than the circumference of container P, second segment 314*b* of second label portion 314 may be affixed to second label portion 314.

With respect to the embodiment shown in FIG. 4, in order to detach the first removable segment 314*a*, therefore, the end user simply grasps and pulls the tear strip 328 (which also preferably has no adhesive on its bottom surface, although it may contain adhesive on such surface) thereby severing the tear strip from the first and second segments 314*a*, 314*b* along perforations 324, 326. Thereafter, the user grasps and pulls the first segment 314*a* to sever it from the first label portion 312 along perforation 322. At this stage, the area of the first label portion 312, as well as any area of second label portion 314, previously covered by the first label segment 314*a* of the second label portion 314 is exposed And, if so designed, the detached first label segment 314 may perform an additional function, e.g., as a redeemable coupon or the like. Additionally, tack adhesive 120 (not shown in FIG. 4) may also be added to the bottom surface of segment 314*a* in a fashion similar to that for labels 110 and 210 in order to provide a resealable means for segment 314*a*. And, if so designed, the first label segment 314 may perform an additional function, e.g. as a resealable segment.

Figure 7:
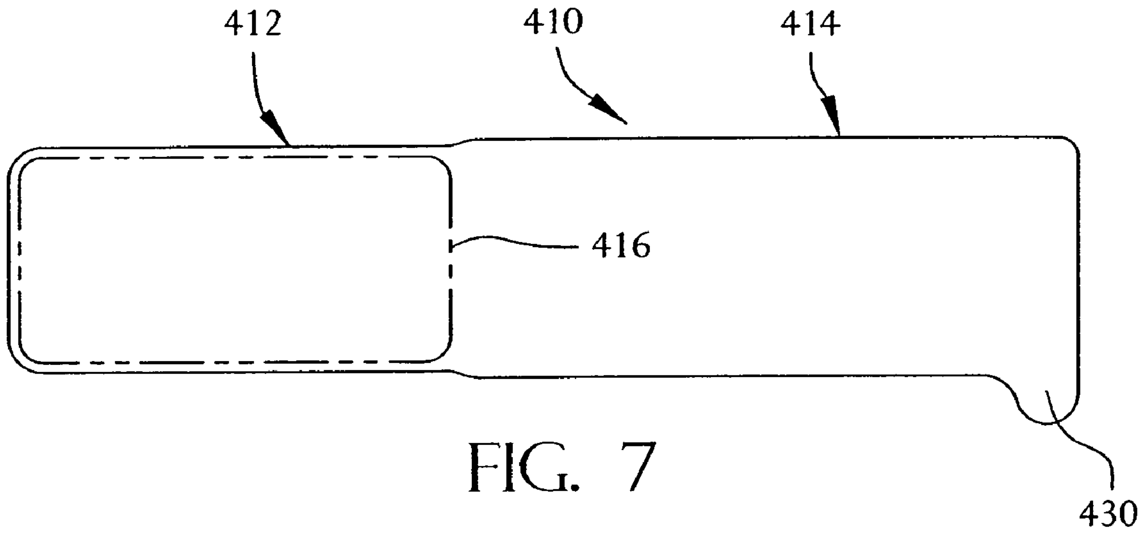
FIGS. 7, 8 and 9 are top plan views of labels according to the present invention including means for facilitating separation of a second portion of the label from a first portion thereof.
Figure 8:
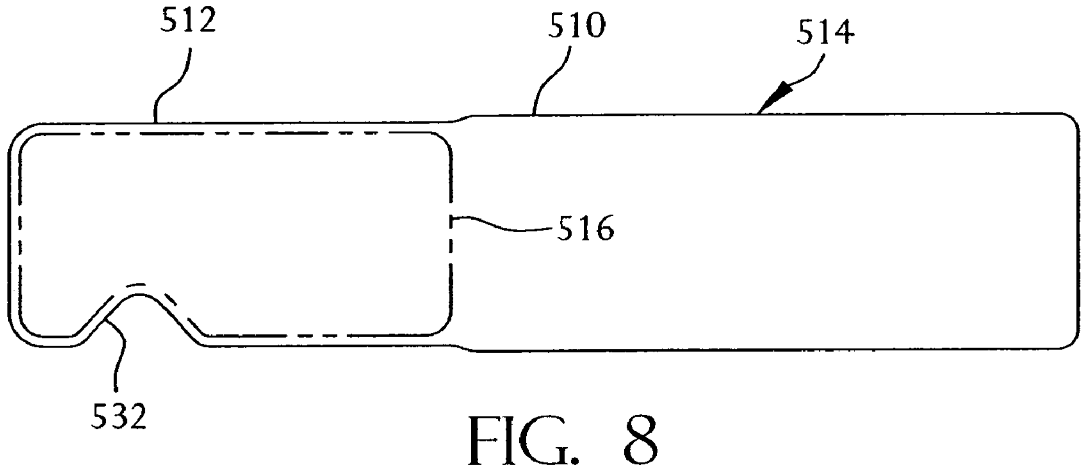
Figure 9:
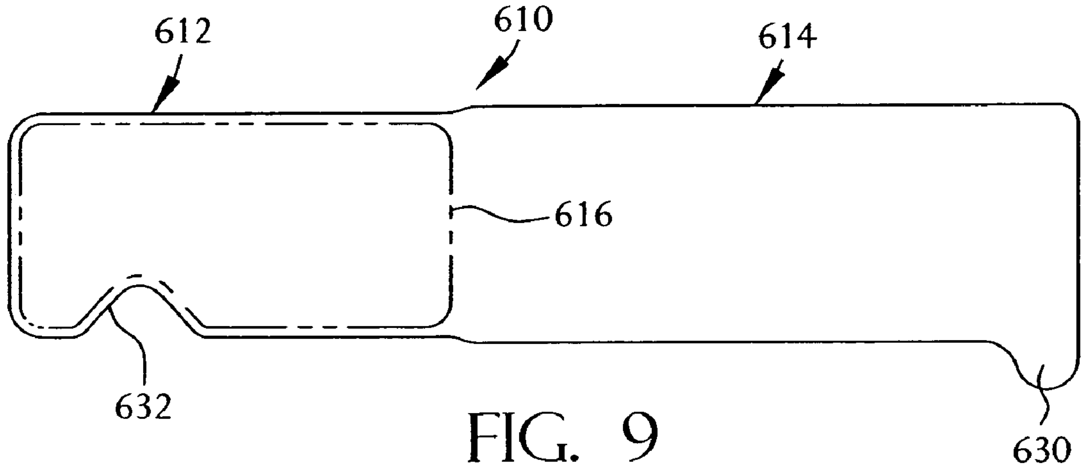

FIGS. 7, 8 and 9 illustrate further embodiments of a product label constructed according to the present invention, identified respectively by reference numerals 410, 510 and 610. It will be understood that labels 410, 510 and 610 may be constructed substantially similarly to any of the label embodiments disclosed herein including, but not limited to, labels 110, 210 and 310 described above or label 710 discussed below. Hence, only those structural aspects of labels 410, 510 and 610 which materially depart from those previously addressed, or whose description may otherwise be necessary for a proper understanding of the invention, will be described in detail.

More particularly, labels 410, 510 and 610 depict exemplary, although not limitative, means for facilitating separation of the releasable second portions of the labels from the first portions thereof when the labels are secured to objects such as products or product containers. These means may include a protrusion 430 provided adjacent a distal end of the second portion 414 of label 410, a notch 532 adjacent an end of the first portion 512 of label 510, or a combination of a notch 630 adjacent a distal end of second portion 614 and a notch 632 adjacent an end of the first portion 612 of label 610. Each of these means enable easier insertion of a user's finger or fingernail beneath the releasable second portion of any of the labels herein described when such labels are affixed to a product or product container whereby the second label portion may be more easily lifted and separated from contact with the first label portion.

Figure 10:
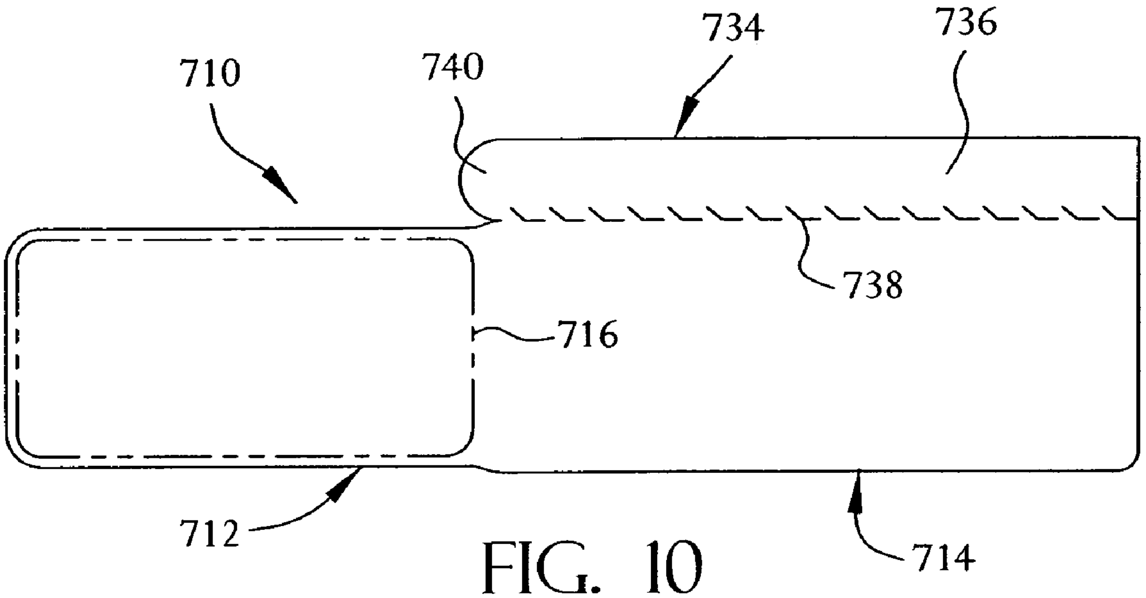
FIG. 10 is a top plan view of a further embodiment of a label constructed according to the present invention having a tear strip.
Figure 11:
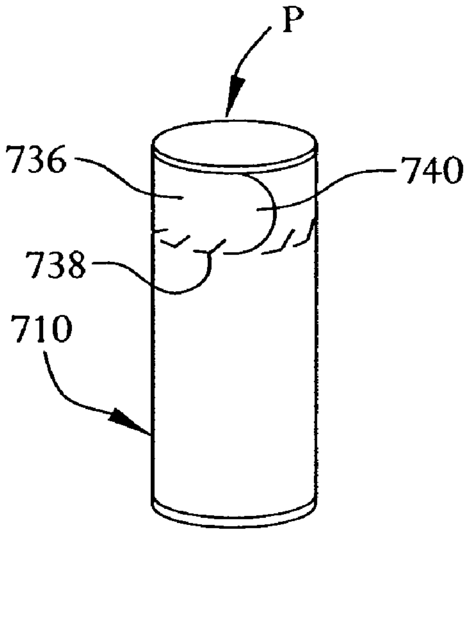
FIG. 11 is a perspective view of the label of FIG. 10 shown wrapped about the circumference of a substantially cylindrical product container.
Figure 12:
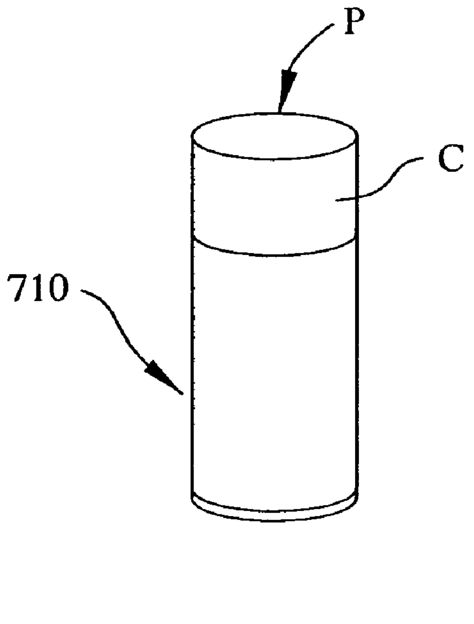
FIG. 12 is a perspective view similar to FIG. 11 with said tear strip removed.

FIGS. 10, 11 and 12 reveal a further presently preferred embodiment of a product label 710 constructed in accordance with the present invention. Label 710 may be manufactured in a substantially similar manner to and/or incorporate any combination of the features of previously described labels 110 through 610. Hence, only those features of label 710 not earlier mentioned will be discussed in detail.

Label 710 preferably includes means 734 for evidencing tampering of product prior to consumption thereof by an end user. According to a presently preferred construction, tamper evident means 734 comprise a fixed or disposable tear strip 736 contiguous with either the first, the first and second or, as shown, the second portion 714 of label 710 along perforation 738. Tear strip 736 may be of any length, but typically corresponds to the length of the circumference of C shown in FIG. 12.

FIG. 11 shows label 710 as it would appear when affixed to the circumferential side wall of a substantially cylindrical product container P . To assure its attachment to the product container prior to removal, all or a portion of the tear strip 736 may be provided with a pressure sensitive or other suitable adhesive. When it is desired to access the contents of container P, the end user simply lifts a distal end flap 740 of the tear strip 736 and pulls the strip away from the remainder of the label 710 such that 10 the strip detaches from the label along perforation 738. Upon removal, the tear strip may then be discarded.

Once the tear strip 736 is removed, the product container cap or lid C is exposed thereby enabling the user to remove the cap and access the contents of the product container P. Should the end user discover however that, prior to purchase or use, that tear strip 736 is missing or damaged, tamper evident means 734 alerts the user that consumption of the contents of product container P should be avoided.

Alternatively, distal end flap 740 may be omitted from tear strip 736. Tear strip 736 may be temporarily or permanently affixed to cap C and, instead of the end user tearing away tear strip 736, the end user may remove cap C by twisting or pulling thereby breaking perforation 738 and alerting a subsequent user that the container had been previously opened. In this embodiment, tear strip 736 may either be removed from or remain attached to cap C.

Figure 18:
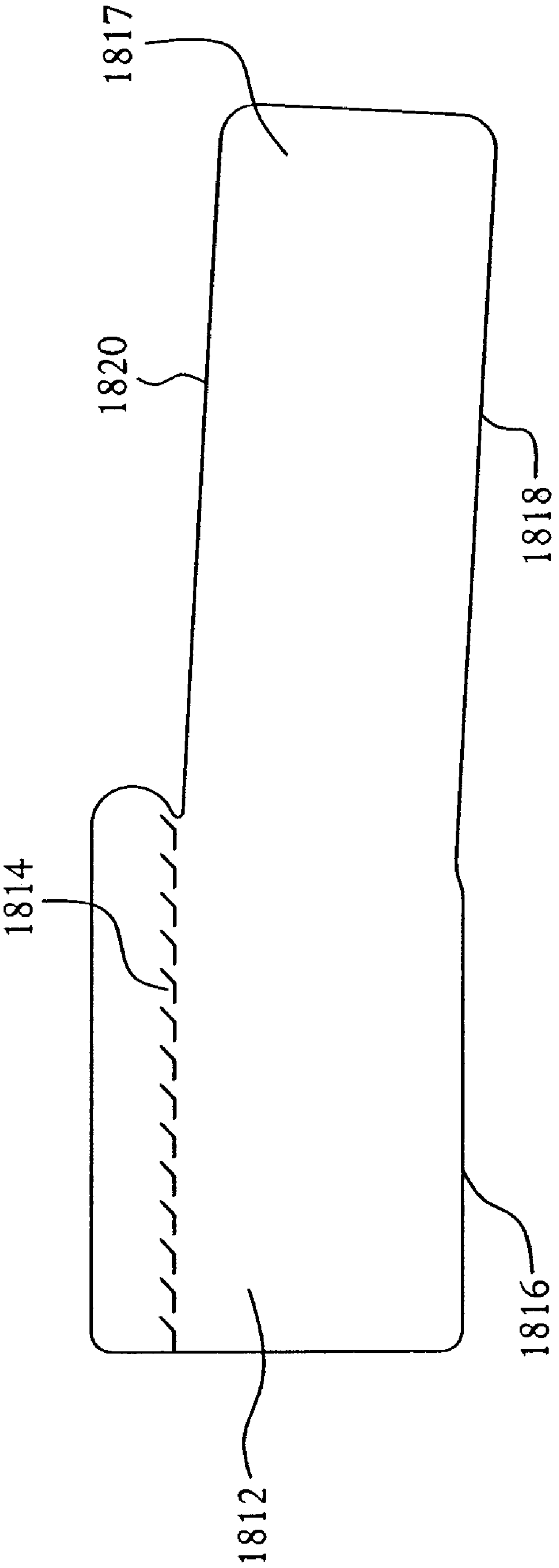
FIG. 18 is a top plan view of a further embodiment of a label constructed in accordance with the present invention

Referring now to FIG. 18, there is shown preferred embodiment of a product label 1800 constructed in accordance with the present invention. The label 1800 is essentially identical to the label shown in FIG. 10, except that the label 1800 is adapted to be applied to irregularly shaped objects, particularly tapered objects. The label 1800 has a first portion 1812 with a top edge 1814 and a but tom edge 1816. The label 1800 also has a second portion 1817 with a top edge 1818 and a bottom edge 1820. To accommodate application to a tapered object having a top with a larger circumference than the bottom, the top edges 1814 and 1820 are longer than the corresponding bottom edges 1816 and 1818. In addition, the first portion 1812 may be oriented at an oblique angle relative to the second portion 1817. The relative length of the top and bottom edges and the angle between the first and second portions depend upon the shape and size of the article to which the label is to be applied. Generally, the greater the taper of the article, the greater the angle and the greater the difference between the length of the top and bottom edges, and vice versa. The specific lengths and angle are preferably selected so that the second portion 1817 substantially precisely overlaps the first portion 1812 when the label 1800 is wrapped more than 360° around an article. Alternatively, the specific lengths and angle may be selected so that the second portion 1817 only partially overlaps the first portion 1812 and partially contacts the container when the label 1800 is wrapped more than 360° around an article. Some or all of the edges may be curved to accommodate the difference in length between the top edges and the bottom edges. In FIG. 18, the top edge 1820 of the second portion 1817 is curved. In another alternative embodiment, the second portion may comprise one or more sub-sections, wherein each sub-section is at an angle relative to the adjacent preceding sub-section and said angle is selected to fit the geometry of the object to which the label is to be applied.

As mentioned above, the label of this invention may be comprised of a flexible and printable substrate such as paper or plastic (such as, for example, polyvinyl chloride, polyethylene or polypropylene) sheet or web material. Although each label may be made individually, labels are preferably produced in larger quantities from rolls of such substrate such as sheet stock which can be continuously printed, coated with adhesive, affixed to release paper, and cut to produce multiple labels. One or more areas or surfaces of the label may also be coated with a lacquer or varnish in order to protect the label and/or printed inks from wear or other degradation. Also, as an alternative to the protective lacquer or varnish, an additional layer of protective material (e.g. a substantial transparent layer of plastic such as polyvinyl chloride, polyethylene or polypropylene) may be applied to select surfaces or areas of the label. The means by which the labels will be made will depend, in part, upon the features which are to be incorporated into such labels.

Figure 13:
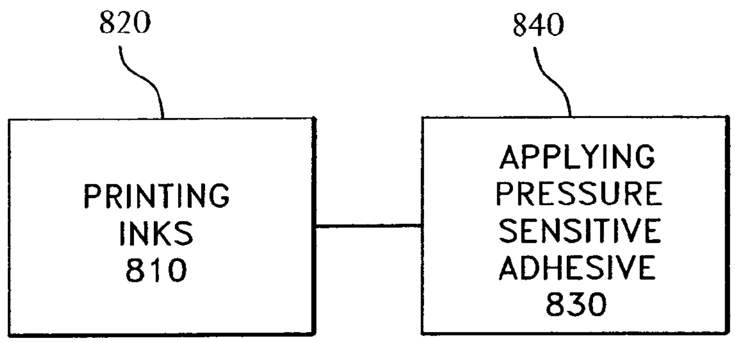
FIG. 13 is a schematic depicting a method for making the labels of this invention.

Referring to FIG. 13, there is shown a schematic depicting a method for making the labels of this invention. It should be noted at the outset that the order in which the steps of the methods herein disclosed are carried out is not necessarily critical to successfully making the labels of this invention. As mentioned above, the labels are made from a flexible and printable substrate 800. Graphic or other inks 810 are printed by printing step 820 (e.g. by flexographic, rotogravure, silk screening or other printing methods) at predetermined locations on the top and/or bottom surfaces of substrate 800. For example, depending on the desired or necessary label configuration, inks 810 may be applied to: the top surface of first label portion 112, 212, 312, 412, 512, 612, or 712; the top surface of second label portion 114, 214, **314*a*, 414, 514, 614, or 714; and/or the bottom surface of second label portion 114, 214, 314, 414, 514, 614, or 714. Pressure sensitive adhesive 830 is applied by step 840 (e.g. hot melt or other adhesive means) to predetermined locations on the bottom surface of substrate 800 so as to provide a means by which the label may be affixed to the desired object. For example, depending on the desired or necessary label configuration, pressure sensitive adhesive 830 may be applied to the bottom surface of the first label portion 112, 212, 312, 412, 512, 612, or 712**.

Figure 14:
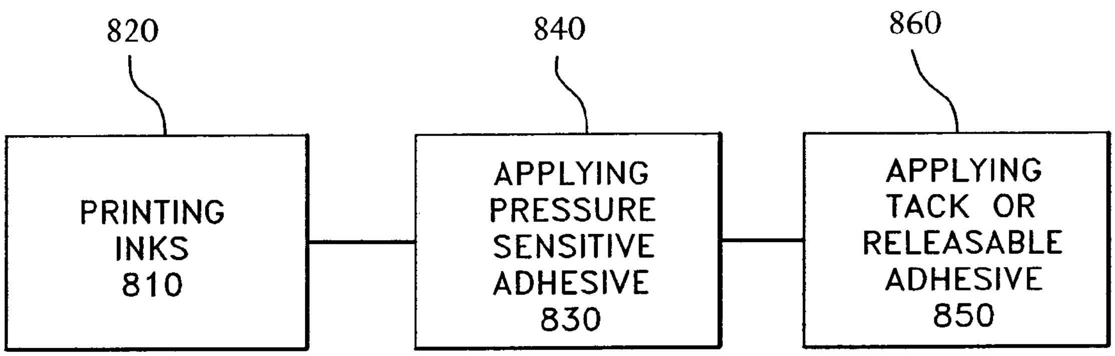
FIG. 14 is a schematic depicting a further method for making the labels of this invention.

FIG. 14 depicts a method for making the labels of this invention which adds to the steps shown in FIG. 13 optional step 860 for applying tack or releasable adhesive 850 to select locations on substrate 800 such that the second label portion may be selectively and repeatedly adhered to the first label portion. For example, depending on the desired or necessary label configuration, tack or releasable adhesive 850 maybe applied to the distal edge of the bottom surface of first label portion 112 (i.e. 118), 212, 312, 412, 512, 612, or 712.

Figure 15:
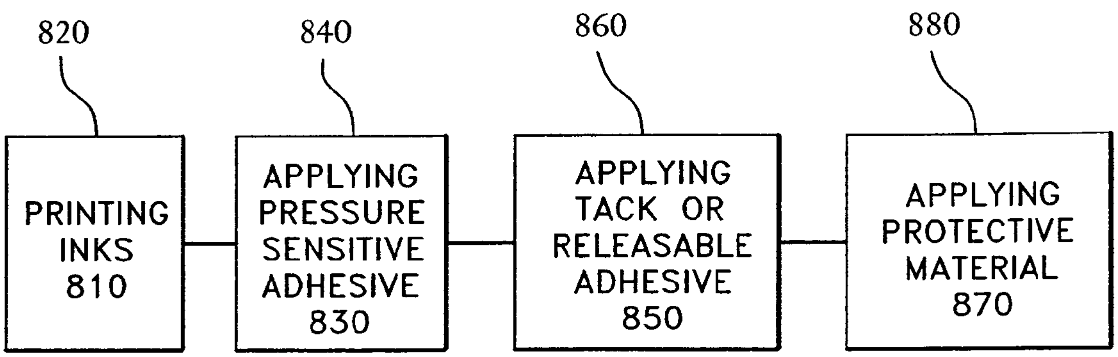
FIG. 15 is a schematic depicting yet a further method for making the labels of this invention.

FIG. 15 depicts a method for making the labels of this invention which adds to the steps shown in FIG. 14 optional step 880 for applying a protective material 870 to select locations over substrate 800 and/or inks 810 in order protect substrate 800 and/or inks 810 from wear or other degradation. For example, depending on the desired or necessary label configuration, protective material 870 (e.g. lacquer, varnish, PVC, or other substantially transparent protective material) may be applied to any surface. In addition, it should be noted that either adhesive 830 or 850 may be applied overprotective material 870 provided that such application does not cause an adverse chemical reaction.

Figure 16:
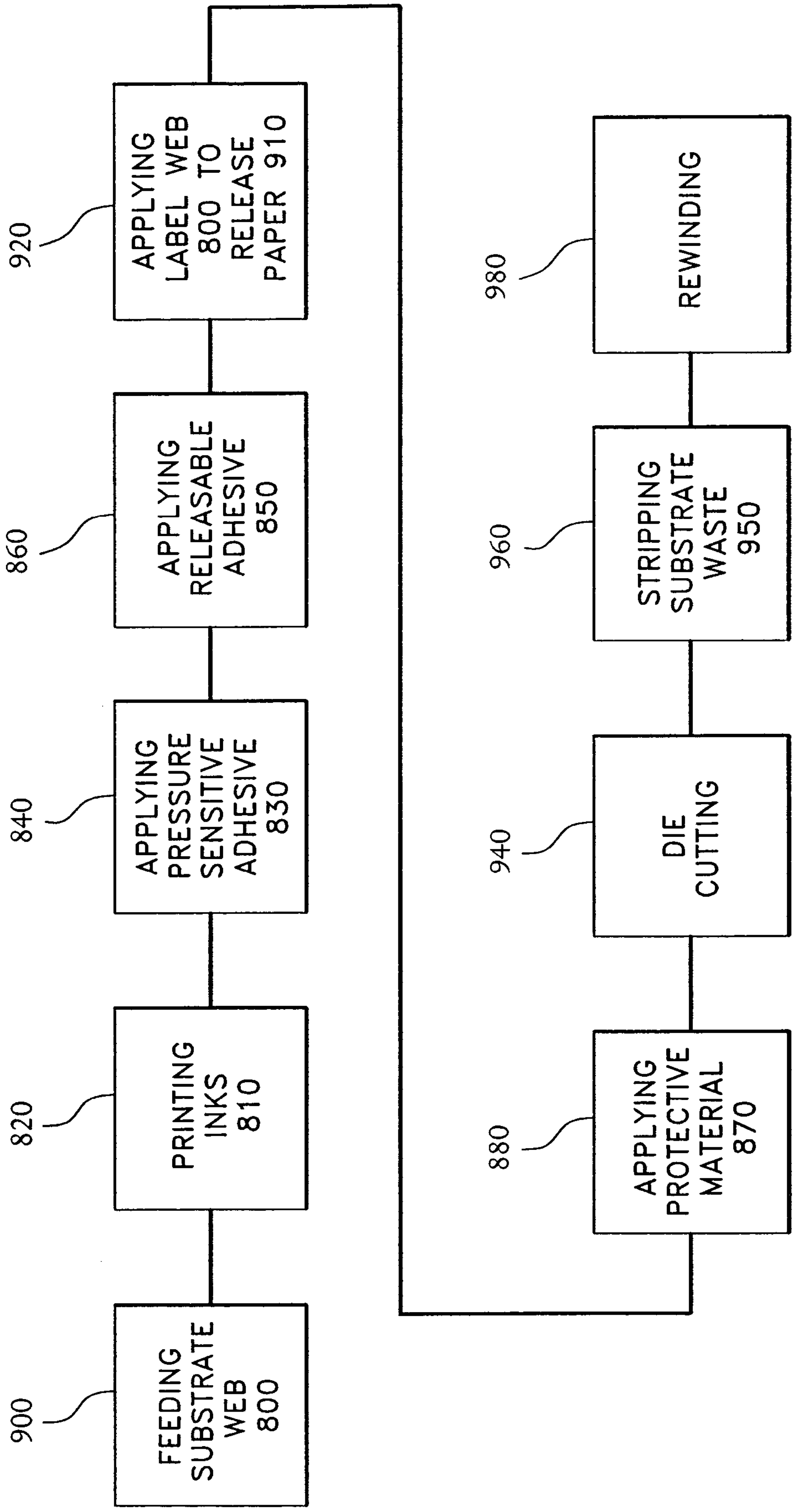
FIG. 16 is a schematic depicting yet another method for making the labels of this invention.

FIG. 16 depicts a method for making the labels of this invention which adds additional optional steps to the steps shown in FIG. 15. In this embodiment, substrate 800 is in the form of a web in order to facilitate the production of larger quantities of labels. Specifically, in step 900 substrate web 800 is fed through a series of process steps. Each such step is represented schematically by a box in FIG. 16.

As indicated above, the order in which the steps are carried out is not necessarily critical to the successful manufacture of the labels of this invention. With this in mind, inks 810 are printed on one or both sides of web 800 in printing step 820. Pressure sensitive adhesive 830 is applied to select areas of web 800 in application step 840. Releasable adhesive 850 is applied to select areas of web 800 in application step 860. A surface of web 800 bearing pressure sensitive adhesive 830 is applied to release paper 910 in application step 920 such that the resulting labels produced from this process may later be removed for application to container P. In application step 880, protective material 870 (e.g. lacquer, varnish (such as ultra violet varnish),PVC, or other substantially transparent protective material) is applied to select surfaces of web 800 which surfaces generally do not contain pressure sensitive adhesive 830. In die cutting step 940, substrate web 800 (along with any protective material 870) is die cut to form label blanks, perforations, and/or other openings (if any) in web 800. In stripping step 960, substrate waste 950 is removed from release paper 910 after die cutting step 940 thereby leaving finished label blanks releasably adhered to release paper 910 for later application to container P. Finally, in optional rewinding step 980, release paper 910 bearing die cut label blanks may be wound into rolls or other convenient form for later application of the resulting labels to container P or other objects by manual or automated means.

Figure 17:
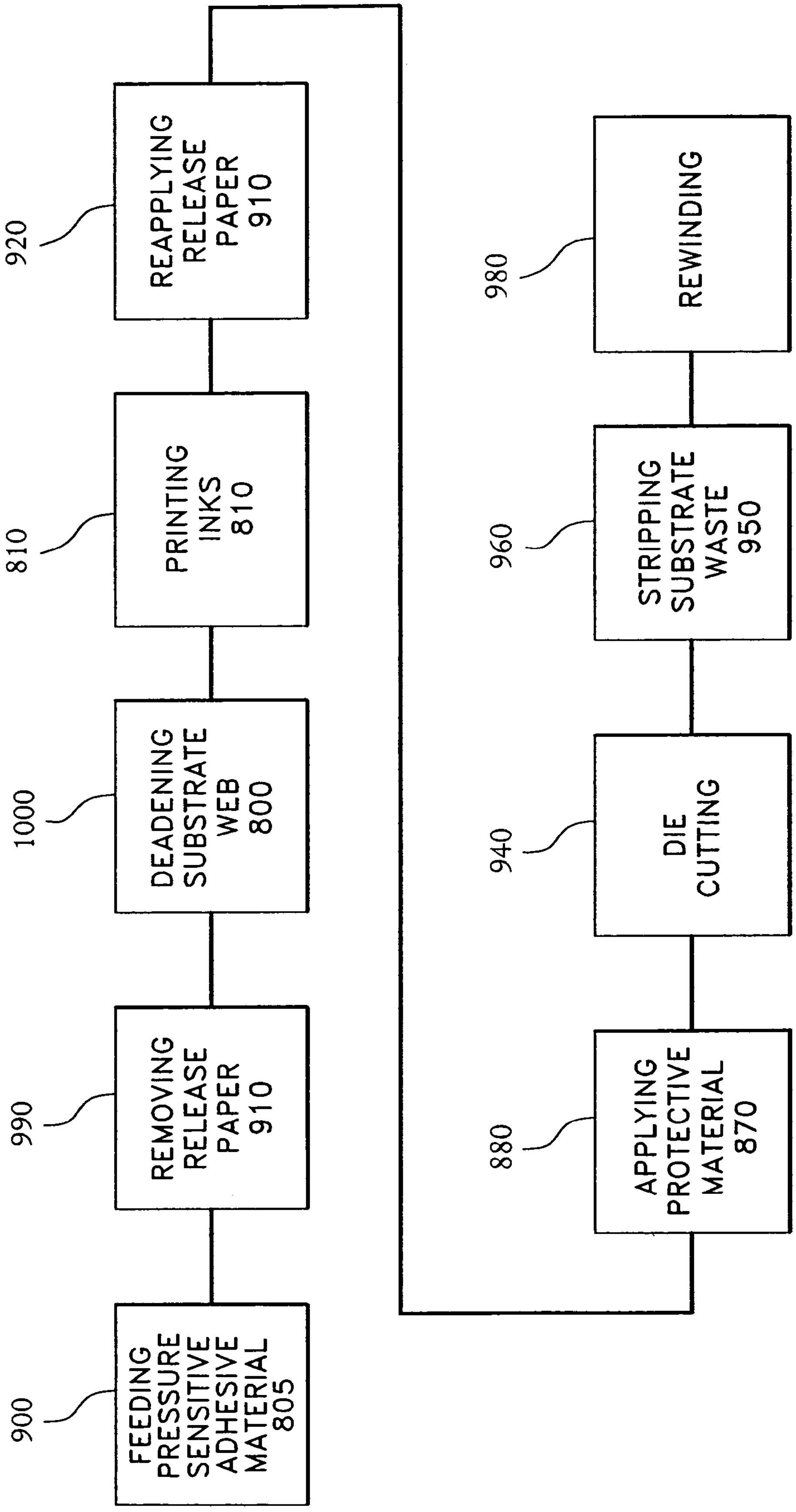
FIG. 17 is a schematic depicting another method for making the labels of this invention.

FIG. 17 depicts another method for making the labels of this invention which method is similar to the method set forth in FIG. 16, except that substrate web 800 is replaced with a pressure sensitive adhesive (PSA) material 805. PSA material 805 comprises substrate web 800 releasably adhered to release paper 910 by pressure sensitive adhesive 830 which adhesive 830 is typically coated on one side of web 800. In step 900 PSA material 805 is fed through a series of process steps. Each such step is represented schematically by a box in FIG. 17. Again, the order in which the steps of this method are carried out is not necessarily critical to the successful manufacture of the labels of this invention. With this in mind, in step 990 release paper 910 is removed from PSA material 805 to expose pressure sensitive adhesive 830.

As discussed above, in certain embodiments of the labels of this invention, it is desirable to have certain portions of the label which are coated with pressure sensitive adhesive 830 (see e.g. portions 116, 216 and 316 of FIGS. 2 through 4 respectively and portions 416, 516, 616 and 716 of FIGS. 7 through 10 respectively) in certain areas which are intended to be indicia or ink bearing surfaces (see e.g. second portions 114, 214 and 314 of FIGS. 2 through 4 respectively and 414, 514, 614 and 714 of FIGS. 7 through 10 respectively). When PSA material 805 is provided with pressure sensitive adhesive 830 in areas where it is necessary or desirable to print indicia or inks 810, such areas must be "deadened" by either removing pressure sensitive adhesive 830 from web 809 or by applying a detackifying material such as a varnish, laminate or other material capable of providing a suitable surface for the printing of indicia or inks 810 This deadening process is particularly useful when it is necessary or desirable to print on the surface of web 800 which surface also bears pressure sensitive adhesive 830 (see e.g. surface 118 of FIG. 5).

The deadening process (if any is required) is carried out in step 1000. With PSA material 805 prepared, web 800 may be printed with inks 810 on any surface of the label which is suitable for accepting inks 810. Such printed surfaces may include both top and bottom surfaces of the label being produced, any surface not bearing pressure sensitive adhesive 830, or any surface which has been deadened in step 1000. Printing step 810 may comprise one or more steps wherein the top and bottom surfaces of the label are printed either simultaneously or in separate steps. In one embodiment of the invention, inks 810 are printed on the top surface of the PSA material 805, PSA material 805 is turned over, and inks 810 are printed on the bottom surface of PSA material 805.

In step 920, release paper 910 is reapplied to web 800 with pressure sensitive adhesive 830. Reapplication step 920 may occur at any time after printing step 810 is completed with respect to the surface of the label which also bears pressure sensitive adhesive 830.

As in the method depicted in FIG. 16, application of protective material 870 takes place in step 880, die cutting of individual labels takes place in step 940, substrate waste 950 is stripped away in step 960, and the resulting web which bears the finished die cut label blanks is rewound in step 980.

Although the invention has been described in detail for the purpose of illustration, it is to be understood that such detail is solely for that purpose and that variations can be made therein by those skilled in the art without departing from the spirit and scope of the invention.

What is claimed is:

1. A method for labeling an object, said method comprising:

providing a substantially planar member having oppositely disposed first and second surfaces, a length, a first end, a second end, a first portion having a top edge and a bottom edge, and a second portion having a top edge and a bottom edge;

wherein said first and second ends are located at opposite ends along said length;

wherein said first portion is adjacent to said first end and said second portion is adjacent to said second end;

wherein said length is greater than a periphery of said object;

wherein said top and bottom edges of said first portion are parallel, and said top and bottom edges of said second portion are parallel, and said top and bottom edges of said first portion are at an oblique angle to said top and bottom edges of said second portion; and wherein said member has printed indicia on at least a portion of said first surface and at least a portion of said second surfaces, and pressure sensitive adhesive on at least a portion of said second surface, said pressure sensitive adhesive being suitable for affixing said label about said periphery of said object; and affixing said substantially planar member to said object.

2. The method of claim 1, further comprising applying a releasable adhesive to a portion of said second surface for facilitating at least partial separation and re-attachment of said label from said periphery of said object when said label is affixed about said periphery of said object.

3. The method of claim 1, further comprising applying a protective material to at least one portion of said member not bearing adhesive.

4. The method of claim 1, further comprising partially deadening at least a portion of said adhesive.

5. The method of claim 1, wherein said substantially planar member further comprises a tab for facilitating at least partial separation and re-attachment of said label from said object.

6. The method of claim 5, further comprising substantially completely deadening said adhesive applied to said tab.

7. The method of claim 1, wherein said substantially planar member further comprises a recessed edge corresponding to said protruding tab for facilitating at least partial separation and re-attachment of said label from said periphery of said object when said label is affixed about said periphery of said object.

8. The method of claim 7, wherein said member further comprises a tab for facilitating at least partial separation and re-attachment of said label from said object.

9. The method of claim 8, wherein at least a portion of said first portion of said substantially planar member is suitable for providing potential tamper evidencing of a capped opening of said object.

10. The method of claim 1, further comprising providing at least one perforation in said planar member.

11. The method of claim 10, wherein said perforation is positioned to facilitate separation of a part of said member from at least one other part of said member.

12. The method of claim 11, wherein at least one of said parts is suitable for providing potential tamper evidencing of said object.

13. The method of claim 12, wherein said substantially planar member further comprises a recessed edge for facilitating at least partial separation and re-attachment of said label from said periphery of said object when said label is affixed about said periphery of said object.

* * * * *

UNITED STATES PATENT AND TRADEMARK OFFICE

CERTIFICATE OF CORRECTION

PATENT NO. : 7,374,633 B2
APPLICATION NO. : 10/634443
DATED : May 20, 2008
INVENTOR(S) : Neil G. Sellars It is certified that error appears in the above-identified patent and that said Letters Patent is hereby corrected as shown below:

In Column 2, line 66, ", A" should be --, a--.
In Column 3, line 13, ", F" should be --. F--.
In Column 3, line 21, ", F" should be --. F--.
In Column 4, line 26, ", P" should be --. P--.
In Column 5, line 54, "312," should be --312.--.
In Column 6, line 9, "exposedAnd" should be --exposed, and--.
In Column 7, line 7, "but tom" should be --bottom--.
In Column 8, line 38, "maybe" should be --may be--.
In Column 8, line 44, "in order protect" should be --in order to protect--.
In Column 8, line 51, "overprotective" should be --over protective--.
In Column 9, line 6, ",PVC" should be --, PVC--.
In Column 9, line 53, "810 This" should be --810--.
In Column 10, line 41 claim 1, "surfaces" should be --surface--.

Signed and Sealed this

Second Day of September, 2008

Jon W. Dudas

JON W. DUDAS
*Director of the United States Patent and Trademark Office*